United States Patent
Nagano

[19]

[11] Patent Number: 4,734,083

[45] Date of Patent: Mar. 29, 1988

[54] FRONT DERAILLEUR FOR A BICYCLE

[75] Inventor: Masashi Nagano, Izumi, Japan

[73] Assignee: Shimano Industrial Company Limited, Osaka, Japan

[21] Appl. No.: 34,942

[22] Filed: Apr. 6, 1987

[30] Foreign Application Priority Data

Apr. 11, 1986 [JP] Japan ............................. 61-54897[U]

[51] Int. Cl.⁴ ............................................... F16H 7/18
[52] U.S. Cl. ......................................... 474/78; 474/140
[58] Field of Search ...................................... 474/78-83, 474/140, 144

[56] References Cited

U.S. PATENT DOCUMENTS 4,479,787 10/1984 Bonnard ................................ 474/82
4,551,121 11/1985 Nagano ............................. 474/78 X Primary Examiner—Stephen J. Novosad
Assistant Examiner—Thuy M. Bui
Attorney, Agent, or Firm—Stevens, Davis, Miller & Mosher

[57] ABSTRACT

A derailleur includes a linkage mechanism including a fixing member, a chain guide having an inner guide plate and an outer guide plate generally parallel to one another, and a linkage device supported to the fixing member and movable axially relative to the front chain gear assembly. The inner guide plate includes an elongate urging portion on its inner side surface closest to the outer guide plate. The urging portion is swollen in a direction toward the outer guide plate and is provided to contact the driving chain to urge it when the chain guide is moved to shift the driving chain. The inner guide plate has a first mounting device positioned above the urging portion and another mounting device positioned below the urging portion. The linkage device is connected to the inner guide plate at both the mounting devices.

5 Claims, 6 Drawing Figures

FRONT DERAILLEUR FOR A BICYCLE

FIELD OF THE INVENTION

The present invention relates to a front derailleur for a bicycle, for shifting a driving chain from one gear to another of a multistage front chain gear assembly of the bicycle, and more particularly, to a front derailleur for a bicycle, which is provided with a chain guide having an outer guide plate and an inner guide plate, whereby the driving chain guided by the chain guide is shifted to one of the multistage front chain gears, thereby changing the bicycle speed.

BACKGROUND OF THE INVENTION

Generally, the above type of derailleur, as disclosed in Japanese Utility Model Publication Gazette No. Sho 56-49,832, is provided with a linkage mechanism comprising a fixing member, a chain guide and a pair of linkage members for supporting the chain guide to the fixing member, so that when the chain is shifted from a smaller diameter front chain gear to a larger diameter one of the multistage front chain gears, the inner guide plate is brought into contact at its inside surface with one side surface of the chain in engagement with the smaller diameter front chain gear to thereby urge the chain toward the larger diameter front chain gear and disengage it therefrom and engage with the smaller diameter one.

The chain guide, however, is formed in a circular arc extending longitudinally of the bicycle along the outer periphery of the front chain gear, with the linkage members being connected to the upper portion of the chain guide through pivot pins. Accordingly, the chain in engagement with the smaller diameter front chain gear moves along the inside surface of the inner guide plate and below and apart from the connecting portions of the chain guide and the linkage members, and is urged axially outwardly of the front chain gear and apart from the connecting portions when the chain is shifted to the larger diameter front chain gear.

Thus, although the chain guide is connected at the upper portion of the inner guide plate with the linkage members, the chain comes into contact with the inner guide plate at the position below and apart from the connecting portions with the linkage member, whereby when the chain is shifted from the smaller diameter front chain gear to the larger diameter one, play at the connecting portion of the chain guide and each linkage member is enlarged and also the inner guide plate deflects reversely to the direction of urging the chain. Hence, it is required to move the chain guide a greater distance axially of the front chain gear to that extent. As a result, the speed change efficiency of the front derailleur is deteriorated when the chain is shifted from the smaller diameter front chain gear to the larger diameter one.

SUMMARY OF THE INVENTION

An object of the invention is to provide a front derailleur for a bicycle, which can increase rigidity of an inner guide plate itself, reduce deflection thereof in the direction reverse to the direction of urging the chain, and improve the speed change efficiency when the chain is shifted from the smaller diameter front chain gear to the larger diameter one to thereby change the bicycle speed.

In the front derailleur provided with a linkage mechanism comprising a fixing member, a chain guide having an outer guide plate and an inner guide plate, and linkage members supported to the fixing member to be movable axially of the multistage front chain gears, wherein the linkage mechanism is deformed to move the chain guide axially of the front chain gears, the present invention provides (1) at the inside surface of the inner guide plate opposite to the outer guide plate a chain urging portion swollen toward the outer guide plate and extending lengthwise of the inner guide plate, and (2) at both vertical sides of the urging portion mounting pieces for connecting the chain guide to the linkage members, so that the linkage members are connected to the inner guide plate such that the urging portion is positioned vertically between the the linkage members.

Accordingly, the front derailleur of the invention yields improved rigidity of the inner guide plate, reduced deflection thereof, and suppressed play even when created at the connecting portion of the chain guide and the linkage members, because the inner guide plate is connected thereto at both vertical sides of the chain urging portion and in close proximity thereto, whereby an operating force for the derailleur transmitted from the linkage members to the inner guide plate is less affected by the play. Thus, the speed change efficiency can be increased.

In the present invention, a pair of linkage members are preferably used. In this case, they are connected to the inner guide plate at both vertical sides of the urging portion as described above.

Also, the chain urging portion is preferably provided at substantially the entire length of the inner guide plate, but may alternatively be formed only at both lengthwise sides of the connecting portions of the linkage members with the inner guide plate, in other words, the portions where the mounting pieces are provided.

The above and further objects and novel features of the invention will be more fully apparent from the following detailed description when the same is read in connection with the accompanying drawings.

DETAILED DESCRIPTION OF THE INVENTION

Figure 1:
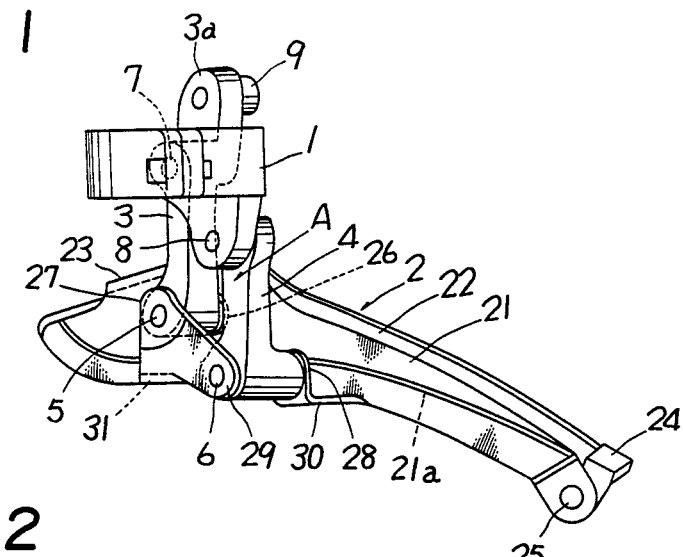
FIG. 1 is a perspective rear view of an embodiment of a front derailleur of the invention.

Referring to FIG. 1, a front derailleur is shown which is provided with a linkage mechanism comprising a fixing member 1, a chain guide 2 having an inner guide plate 21 and an outer guide plate 22, and first and second linkage members 3 and 4, the linkage mechanism being deformed to allow the chain guide 2 to move axially of multistage front chain gears. The chain guide 2 is biased by a return spring (not shown) axially of the multistage front chain gears and toward a smaller diameter front chain gear thereof.

The respective guide plates 21 and 22 thus are formed in the shaped of a circular arc extending longitudinally of the bicycle along the outer periphery of the multistage front chain gear and juxtaposed axially outwardly and inwardly of the front chain gear at an interval larger than the width of the chain so that the chain travels between the inner and outer guide plates 21 and 22. The inner and outer guide plates 21 and 22 are connected integrally with each other at the upper edges at one lengthwise end portion thereof through a connecting plate 23 which is formed in continuation of each guide plate 21 or 22, and at their other lengthwise end portions through a connecting piece 24 which is formed in continuation of the outer guide plate 22, and a connecting pin 25 which connects inner guide plate 21 to connecting piece 24.

The linkage members 3 and 4 each extend vertically and are pivoted at their lower ends to the chain guide 2 through pivot pins 5 and 6 and at their upper ends to the fixing member 1 through pivot pins 7 and 8.

In the embodiment shown in FIGS. 1 through 6, a chain urging portion 21a is provided at the inner surface of inner guide plate 21 opposite to the outer guide plate 22. The chain urging portion is swollen toward the outer guide plate 22 so as to contact with the chain and urge it when the chain guide 2 is moved and is provided at substantially the entire length from one lengthwise end to the other end of the plate 21. The linkage members 3 and 4 are connected at their lower ends to the inner guide plate 21 in a manner of putting therebetween the urging portion 21a.

Figure 5:
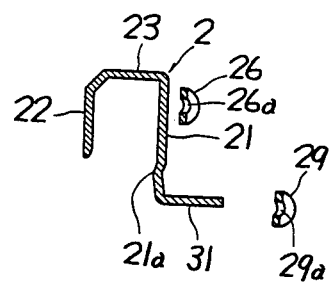
FIG. 5 is a sectional view taken on the line V—V in FIG. 3.
Figure 6:
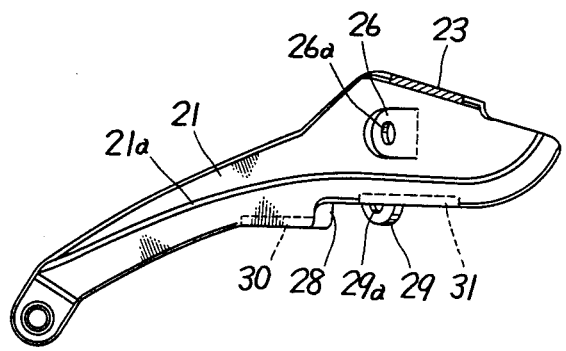
FIG. 6 is a sectional view taken on the line VI—VI in FIG. 3.

The urging portion 21a as shown in FIG. 5 is swollen at a vertically intermediate portion toward the outer guide plate 22, and may alternatively be separate from the inner guide plate 21 and fixed thereto by a fixing means, such as by welding or the like.

The inner guide plate 21 is connected with the linkage members 3 and 4 by first through fourth mounting pieces 26 through 29 provided at the inner guide plate 21. The first mounting piece 26 is formed by cutting and raising part of the inner guide plate 21 at one lengthwise end thereof and above the urging portion 21a.

Figure 2:
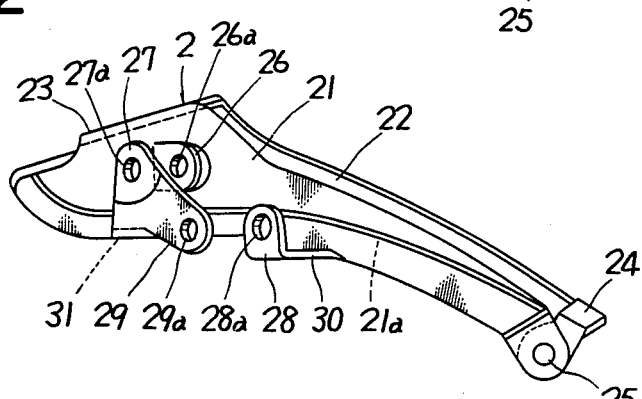
FIG. 2 is a rear view of the chain guide of the FIG. 1 embodiment.
Figure 3:
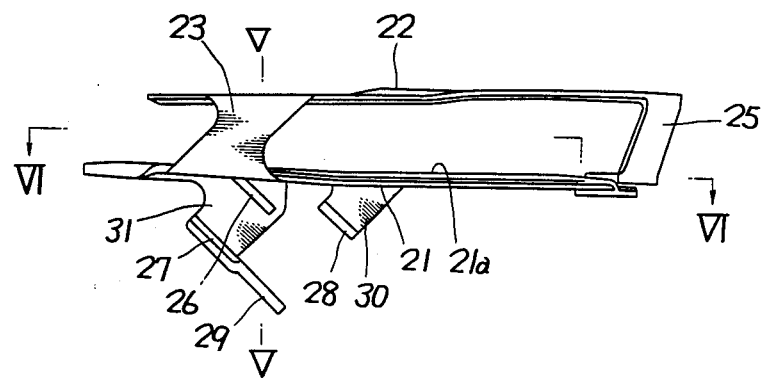
FIG. 3 is a plan view of the chain guide.
Figure 4:
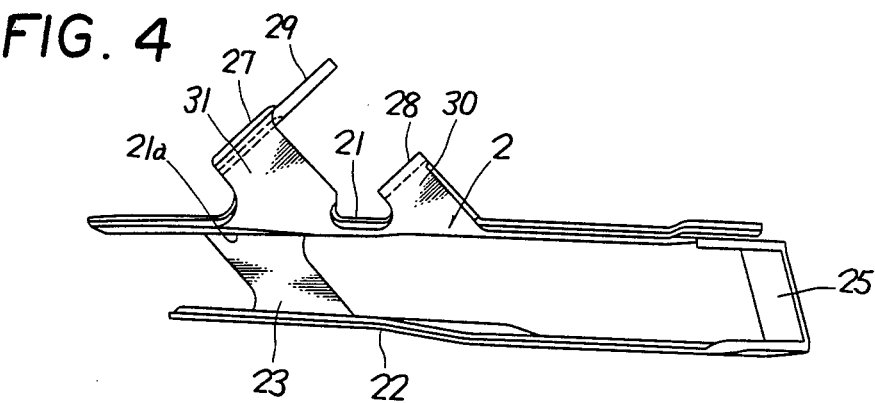
FIG. 4 is a bottom view thereof.

The third and fourth mounting pieces 28 and 29 are formed such that projections 30 and 31 project perpendicularly from the lower edge of the inner guide plate 21 and slantwise with respect to the side surface thereof, and rise perpendicularly at their utmost ends respectively as shown in FIGS. 3 and 4. The second mounting piece 27 is formed by extending the rising portion at the projection 31 in the rising direction as shown in FIGS. 1 and 2. The first and second mounting pieces 26 and 27 are disposed opposite to each other and connect with the lower end of the first linkage member 3 through the pivot pin 5 inserted into bores 26a and 27a formed at the opposite portions of the mounting pieces 26 and 27, and thus the first linkage member 3 connects with the inner guide plate 21 above the urging portion 21a thereof.

The third and fourth mounting pieces 28 and 29 provided at the projections 30 and 31 are disposed opposite to each other and connect with the lower end of the second linkage member 4 through the pivot pin 6 inserted into bores 28a and 29a formed at the opposite portions of the mounting pieces 28 and 29 respectively, and thus the linkage member 4 connects with the inner guide plate 21 below the urging portion 21a thereof.

Hence, the inner guide plate 21 is connected to the linkage members 3 and 4 in the vicinity of the urging portion 21a and at both the vertical sides thereof.

In addition, in FIG. 1, reference numeral 3a designates an extension upward from the upper end of the first linkage member 3, and a fixture 9 for fixing one end of an operating wire is provided at the extension 3a.

In the front derailleur of the invention constructed as described above, when the chain in engagement with the smaller diameter front chain gear of the multistage front chain gear assembly is shifted to the larger diameter front chain gear thereof, the operating wire fixed at one end to the fixture 9 is pulled to deform the linkage mechanism against the return spring to thereby move the chain guide 2 axially of the larger diameter front chain until it is positioned opposite thereto. Hence, the chain comes into contact with the urging portion 21a, is urged axially of the larger diameter front chain gear to be brought into press-contact with the side surface thereof, and is raised radially outwardly of the larger diameter front chain gear following the rotation thereof. As a result, the contacting position of the chain with the urging portion 21a is displaced therealong toward one end side of the inner guide plate 21 to lead to engagement of the chain with the larger diameter front chain gear.

Since the first linkage member 3 connects with the inner guide plate 21 above the urging portion 21a and the second linkage member 4 connects with the same below the urging portion 21a, lagging of the chain guide with respect to operation of the respective linkage members 3 and 4 caused by the play of the inner guide plate 21 when the chain is shifted from the smaller diameter front chain gear to the larger diameter gear, can be minimized. Thus, with minimized lagging and increased rigidity due to urging portion 21a provided at the inner guide plate 21 and less deflection thereof, the speed change efficiency of the front derailleur is improved when the chain is shifted from the smaller diameter front chain gear to the larger diameter one.

Alternatively, the lower end of the first linkage member 3 may be connected to the inner guide plate 21 at a position below the urging portion 21a and that of the second linkage member 4 may be connected to the same at a position above the urging portion 21a. In brief, the linkage members 3 and 4 need only connect with the inner guide plate 21 at both vertical sides of the urging portion 21a. Also, the linkage members 3 and 4 may alternatively be connected to the chain guide 2 through a connecting means other than the pivot pins.

Alternatively, the linkage mechanism may comprise the fixing member 1, the chain guide 2 and a single linkage member. In this case, the linkage member connects as its one end portion, for example formed, found bifurcate ends, to the chain guide in a manner such that urging portion 21a is vertically positioned between the bifurcate ends.

Mounting pieces 26 through 29 are slanted outwardly rearwardly so that, when the chain is shifted to the larger diameter front chain gear through the linkage members 3 and 4, the chain guide 2 is intended to move axially and forwardly of the multistage front chain gears, thereby further improving the smoothness of the chain shifting and improving the speed change efficiency. However, the present invention is not limited to such construction, but may provide the mounting pieces 26 through 29 perpendicularly to the inner guide plate 21.

While an embodiment of the invention has been shown and described, the invention is not limited to the specific construction thereof, which is merely exemplary in the specification rather than defined as limited thereby.

What is claimed is:

1. A front derailleur for a bicycle for shifting a driving chain from one gear to another of a multistage front chain gear assembly having a plurality of axially spaced generally parallel gears, comprising:

a linkage mechanism comprising (i) a fixing member, (ii) a chain guide having an inner guide plate and an outer guide plate generally parallel to one another, and (ii) a linkage means supported to said fixing member and movable in a predetermined direction, said predetermined direction being adapted to be oriented axially relative to said front chain gear assembly, said inner guide plate comprising an elongate urging portion on its inner side surface closest to said outer guide plate, said urging portion being swollen in a direction toward said outer guide plate, said urging portion contacting said driving chain when said chain guide is moved in said predetermined direction to shift said driving chain from one gear to another of said multistage front chain gear assembly, and said inner guide plate having a mounting means positioned above said urging portion and another mounting means positioned below said urging portion, said linkage means being connected to said inner guide plate at both of said mounting means.

2. The derailleur as in claim 1, wherein said linkage means comprises a first linkage member and a second linkage member, said mounting means positioned above said urging portion comprises first and second mounting pieces connected with said first linkage member, and said mounting means positioned below said urging portion comprises third and fourth mounting pieces connected with said second linkage member.

3. A derailleur as in claim 1, wherein said mounting means positioned above said urging portion and said mounting means positioned below said urging portion are both positioned in close proximity to said urging portion.

4. The derailleur as in claim 2, wherein each of said mounting pieces is positioned on an outer side of said inner guide plate farthest from said outer guide plate and is inclined relative to a plane parallel to said inner and outer guide plates.

5. The derailleur as in claim 1, wherein said urging portion extends substantially from one lengthwise end to the other lengthwise end of said inner guide plate.

* * * * *